R. GREGG.
Sheep Stock.
No. 39,566.  Patented Aug. 18, 1863.
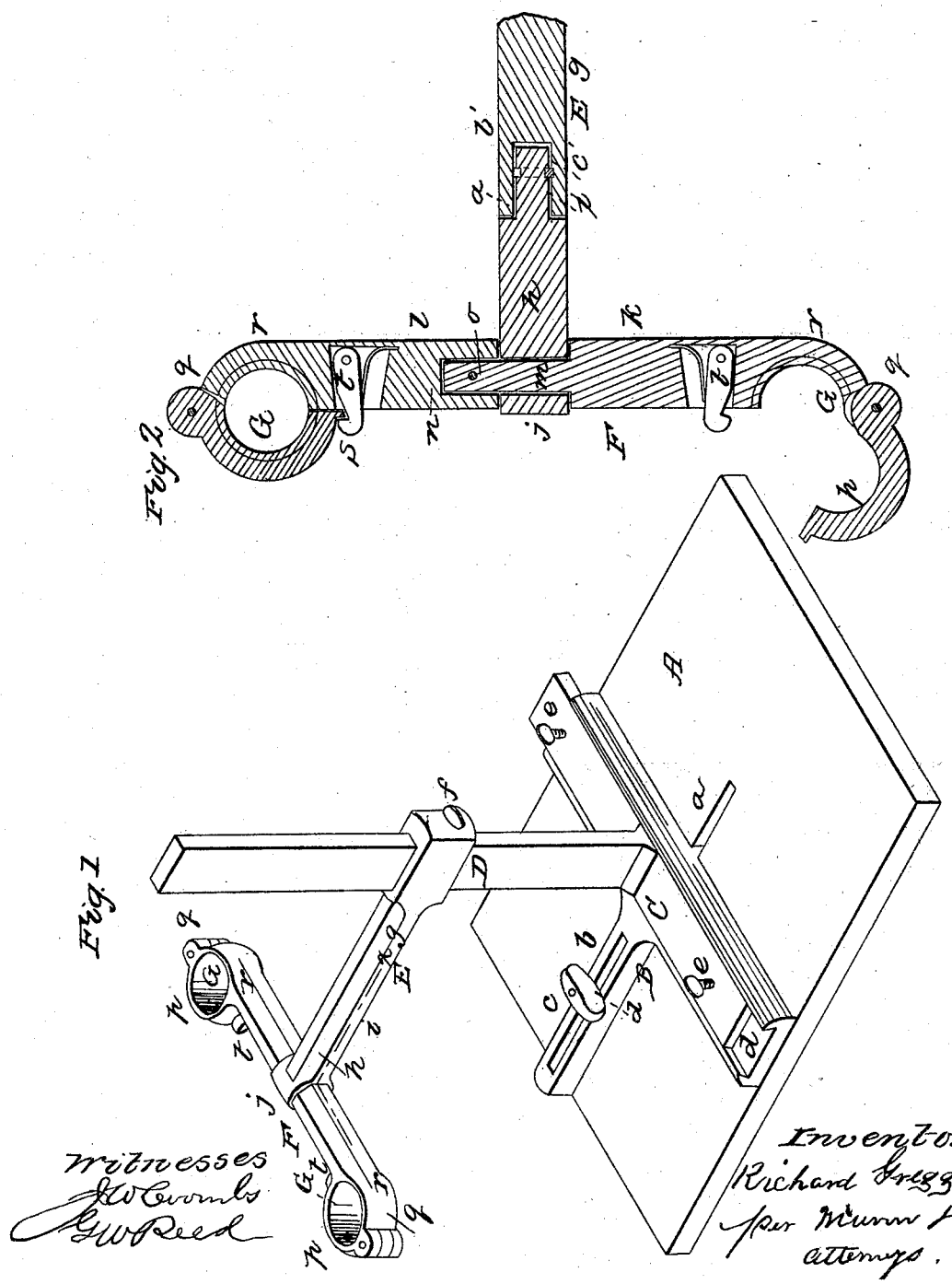
Witnesses
J. W. Coombs
G. W. Reed
Inventor
Richard Gregg
per Munn & Co
Attorneys

UNITED STATES PATENT OFFICE.

RICHARD GREGG, OF LAWRENCEBURG, INDIANA.

IMPROVEMENT IN STOCKS FOR SHEARING SHEEP.

Specification forming part of Letters Patent No. 39,566, dated August 18, 1863.

*To all whom it may concern:*

Be it known that I, RICHARD GREGG, of Lawrenceburg, in the county of Dearborn and State of Indiana, have invented a new and improved device for holding sheep to aid in the operation of shearing the same, and which device I term a "sheep-stock;" and I do hereby declare that the following is a full, clear, and exact description of the same, reference being had to the accompanying drawings, making a part of this specification, in which—

Figure 1 is a perspective view of my invention; Fig. 2, a section of a portion of the same, taken in the line $x\,x$, Fig. 1.

Similar letters of reference indicate corresponding parts in the two figures.

The object of this invention is to obtain a simple and efficient device to aid in shearing sheep; and it consists in the employment or use of adjustable uprights in connection with adjustable arms, the latter being fitted on the former, and provided with swivel-stocks or leg-clamps, all arranged as hereinafter fully shown and described.

To enable those skilled in the art to fully understand and use my invention, I will proceed to describe it.

A represents a bench or platform on which the device is placed. This bench or platform has a slot, $a$, made longitudinally and centrally in its upper surface, which serves as a guide for a T-shaped slide, B, one part of said slide having a slot, $b$, made through it, in which a screw, $c$, is fitted, said screw having a nut, $d$, on its upper end, and the lower end of the screw being provided with a head to fit in the slot $b$ of the bench or platform. By means of the screw and nut the slide B may be secured at any desired point within the scope of its movement. The other part of the slide B has a dovetail groove, $d$, made longitudinally in its upper surface and extending its whole length. In this groove $d$ a slide, C, is fitted and allowed to work freely. This slide has two set-screws, $e\,e$, passing through it—one near each end—and to the center of this slide C there is attached an upright, D, on which a horizontal arm, E, is fitted and allowed to slide freely, the arm being secured at any point on the upright D by means of a set-screw, $f$. The arm E is formed of two parts, $g\,h$, which are connected by a swivel-joint, $i$, which is shown clearly in Fig. 2, said joint being formed of a cylindrical tenon, $a'$, on the part $h$, which fits in a circular recess, $b'$, in the part $g$, the tenon being secured in the recess by a pin, $c'$. This swivel-joint admits of the part $h$ revolving, and the outer end of $h$ is made in the form of an eye, $j$.

F represents a bar, which is formed of two parts, $k\,l$, one of which, $k$, has a cylindrical tenon, $m$, at its inner end, said tenon passing through the eye $j$ and into a circular recess, $n$, in the inner end of the part $l$, the tenon $m$ being secured in the recess $n$ by a pin, $o$. The two parts $k\,l$ of the bar F, therefore, it will be seen, are connected to the arm E by a swivel-joint, which admits of the bar F turning in the outer end of the arm E. The two parts $k\,l$ of the bar F project at equal distances from the arm E, and at the outer ends of each of said parts there is a clamp, G. These clamps are formed of semicircular bars $p$, which are connected by joints $g$ to the ends of the parts $k\,l$, said ends being hollowed out so as to form semi-circles $r$, which comprise the other parts of the clamps. The semicircular bars $p$, at their outer or disengaged ends, are provided each with a lip, $s$, and these lips, when the bars $p$ are closed, engage with spring-catches $t$, which are shown clearly in Fig. 2.

There are two of the above-described devices on each bench or platform, a sufficient space being allowed between them to admit of the perfect operation of each part.

The legs of the sheep are secured in the clamps G, and the sheep may be raised and lowered and secured at the desired or proper height by securing the arm E by means of the set-screw F. The sheep may be turned in any direction, as circumstances may require. It may be adjusted over on either side, and inclined at its fore or back part, and may be adjusted bodily toward and from the operator by moving the upright D, the latter being secured at the desired point by means of the set-screws $e\,e$.

The device is extremely simple and efficient, and may be constructed at a small cost of either wood or iron.

Having thus described my invention, what I claim as new, and desire to secure by Letters Patent, is—

The adjustable upright D, in combination with the arm E, formed of two parts, $g\ h$, connected together by a swivel-joint, $i$, and the revolving bar F, provided with clamps G and fitted in the outer end of the arm E, all being arranged substantially as and for the purpose herein set forth.

RICHARD GREGG.

Witnesses:
 ANDREW HOTER,
 BEN. GOULD.